(No Model.)
W. FORD.
SCROLL SAWING MACHINE.
No. 257,309.                        Patented May 2, 1882.
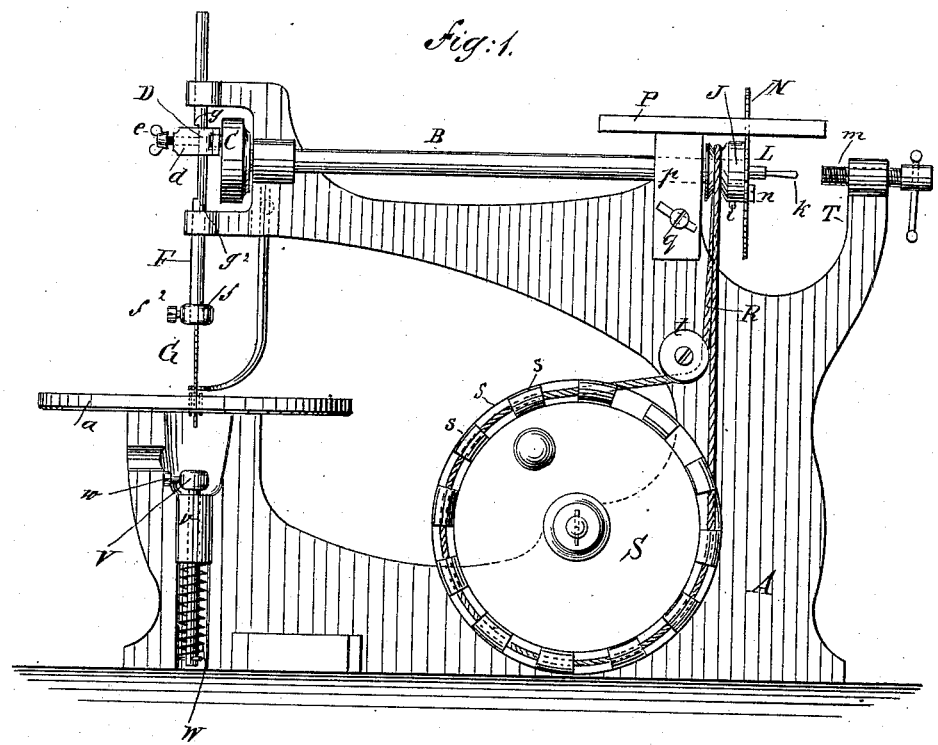
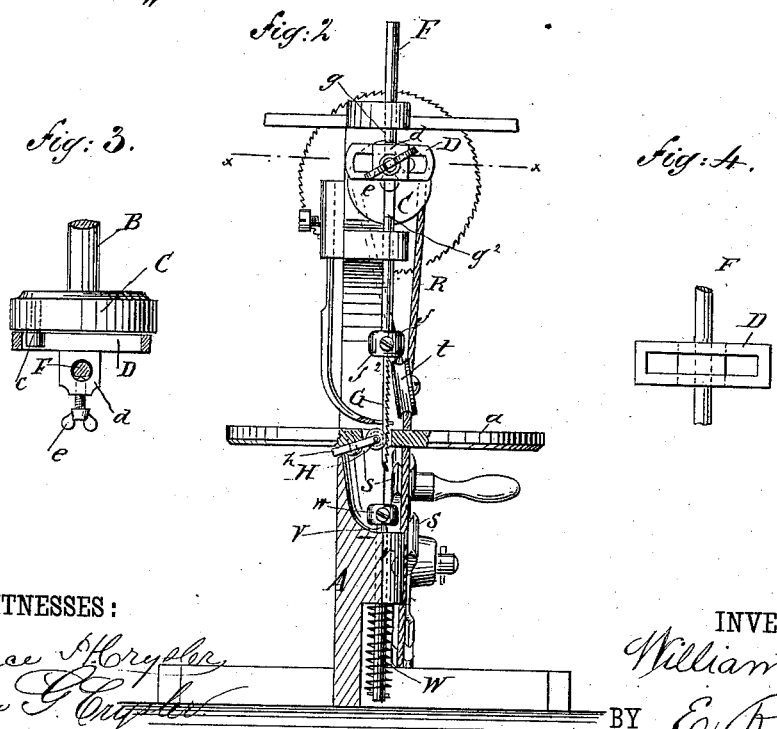
WITNESSES:
Clarence H Crysler
Austin G Crysler
INVENTOR:
William Ford,
BY E. R. Brown
ATTORNEY

UNITED STATES PATENT OFFICE.

WILLIAM FORD, OF BROOKLYN, NEW YORK.

SCROLL-SAWING MACHINE.

SPECIFICATION forming part of Letters Patent No. 257,309, dated May 2, 1882.

Application filed November 8, 1881. (No model.)

*To all whom it may concern:*

Be it known that I, WILLIAM FORD, of Brooklyn, in the county of Kings and State of New York, have invented certain new and useful Improvements in Sawing-Machines; and I do hereby declare that the following is a full, clear, and exact description thereof.

My invention relates to a machine which is more particularly intended for the use of amateurs; but it may also be made of sufficient dimensions to adapt it to be used in pattern-shops, factories, and similar establishments.

The invention consists in a novel construction, arrangement, and combination of the various parts of the apparatus, whereby provision is made for scroll or fret sawing, for circular sawing, for drilling or boring, and for turning in one and the same machine, as hereinafter more particularly described.

In the accompanying drawings, Figure 1 is a side view of a machine embodying my improvements. Fig. 2 is an end view of the same, partly in section. Figs. 3 and 4 are detail views, hereinafter referred to.

The working parts of the apparatus are attached to and carried by a frame, A, which may be of any suitable description. It is here shown as provided with a base, by which it is adapted to be secured to a bench or table by means of screws or bolts or a clamping thumb-screw, or in any suitable manner. The upper part of the frame A terminates in an arm or extension, in which is journaled a horizontal shaft, B. At the left-hand end of this shaft is a wheel, C, carrying a crank-pin, $c$, which may be provided with a friction-roller. This crank-pin works in a slotted yoke, D, a top view of which is shown partly in section in Fig. 3, and a rear view in Fig. 4. On the front side of this yoke is a boss or enlargement, $d$, in which is a vertical hole, and which is provided with a set-screw, $e$. Through this hole passes the saw-carrying rod or bar F, the lower end of which is forked or split, and is surrounded by a collar, $f$, provided with a clamping set-screw, $f^2$, by which means the upper end of the saw G is firmly clamped and held in position. The rod or bar F is secured to the yoke D by means of the set-screw $e$. The rod F has a portion of one side recessed, so as to form two shoulders, $g$ $g^2$, between which the point of the set-screw $e$ engages. When the saw is in position for work the set-screw $e$ engages with the rod F near the the upper shoulder, $g$, so that the lower end of the saw is continuously below the surface of the work-table $a$. When the saw is to be raised in order to insert it in or withdraw it from the work the set-screw $e$ is loosened so as to allow the rod to rise until the point of the saw is higher than the table, in which position it is held by means of the set-screw until the work is placed in position on the table $a$. By loosening the set-screw still further the rod F may be entirely withdrawn.

As the lower end of the saw is not attached to a carrier, but is free to work like a sewing-machine needle, it is necessary to support it below the work. For this purpose I employ a grooved steel roller, H, which is carried by a bracket, $h$, attached to the under side of the table immediately under the hole through which the saw works. The saw G works with its back in the groove of this roller, and is thus prevented from being bent, strained, or twisted out of line.

At the right-hand end of the shaft B is a collar, J, attached to said shaft by a set-screw, $i$. This collar serves the double purpose of a pulley and a circular-saw carrier. This end of the shaft also carries a drill-chuck, L, in which a drill, $k$, may be held and the work fed up to the drill by means of a hand-screw, $m$. This end of the frame A is formed with the arm T, of such dimensions as to admit of use as a small lathe.

The circular saw N is attached to the collar J by a set-screw, $n$. The table P, used in connection with this saw, is provided with an arm, $p$, in which is a slot through which a screw, $q$, passes into the frame A. By this means the table P may be adjusted at any desired angle.

Motion is imparted to the shaft B by means of a band, R, from the main driving-wheel S, passing a quarter-turn pulley, $t$, and thence around the pulley J. This wheel S is provided with a mutilated flange, $s$, the sections of which are turned in opposite directions. By this construction of the wheel the belt is kept continually taut and prevented from slipping.

In order to provide for attaching the lower end of the saw to a carrier, if desired, I employ a rod, V, working in a bearing, $v$, in the frame A and surrounded by a spring, W, below said bearing, and provided with a forked upper end and a clamping-screw, w.

Having thus described my invention, what I claim as new, and desire to secure by Letters Patent, is—

The vertically adjustable and reciprocating saw-carrying rod F, having removable collar f and shoulders $g$ $g^2$, in combination with the slotted yoke D, having boss d, provided with set-screw e, and the crank-wheel C, shaft B, and driving mechanism, substantially as shown and described.

WILLIAM FORD.

Witnesses:
E. R. BROWN,
JAMES H. HUNTER.